United States Patent
Bryant

(10) Patent No.: US 10,406,538 B2
(45) Date of Patent: Sep. 10, 2019

(54) MICRO STREAM EMITTER FOR USE IN IRRIGATION SYSTEMS

(71) Applicant: Randy Bryant, Auburn, CA (US)

(72) Inventor: Randy Bryant, Auburn, CA (US)

(*) Notice: Subject to any disclaimer, the term of this patent is extended or adjusted under 35 U.S.C. 154(b) by 228 days.

(21) Appl. No.: 15/386,321

(22) Filed: Dec. 21, 2016

(65) Prior Publication Data
US 2018/0169670 A1    Jun. 21, 2018

(51) Int. Cl.
   B05B 1/14       (2006.01)
   A01G 25/02      (2006.01)
   B05B 15/622     (2018.01)

(52) U.S. Cl.
   CPC .............. *B05B 1/14* (2013.01); *A01G 25/023* (2013.01); *B05B 15/622* (2018.02)

(58) Field of Classification Search
   CPC ........ A01G 25/02; A01G 25/023; B05B 1/06; B05B 1/14
   USPC .......................... 239/558, 559, 542, 552, 554
   See application file for complete search history.

(56) References Cited

U.S. PATENT DOCUMENTS

| | | | | |
|---|---|---|---|---|
| 2,650,132 A | * | 8/1953 | Reinecke | B05B 1/14 239/391 |
| 4,365,757 A | * | 12/1982 | Alajos | A01G 25/023 239/567 |
| 4,477,026 A | * | 10/1984 | Lockwood | B05B 1/265 239/428.5 |
| 5,642,861 A | * | 7/1997 | Ogi | B05B 1/14 239/568 |
| 6,942,168 B2 | * | 9/2005 | Rance | B05B 1/265 239/589 |
| 7,007,865 B2 | * | 3/2006 | Dodd | B05B 1/1672 239/225.1 |
| 7,581,687 B2 | * | 9/2009 | Feith | B05B 1/267 239/391 |
| 8,662,414 B2 | * | 3/2014 | Causby | A01G 25/02 137/859 |

* cited by examiner

*Primary Examiner* — Joshua T Kennedy

(57) ABSTRACT

The micro stream emitter include a body having two different geometries water outlet ports providing downward stream into the soil wetting the root zone and with the second geometries water outlet wetting the surrounding plants area. The internal passage of the emitter shown a the lower passage supplying water to the lower ports that actually uses top wall with a annular depression, forming a diaphragm enabling the water to reflex into the lower port outlets. Similar to the internal lower passage the upper passage with includes a smaller diameter passage uses top wall with an annular depression, forming a diaphragm enabling the water to reflex into the upper port outlets.

1 Claim, 7 Drawing Sheets

MICRO STREAM EMITTER FOR USE IN IRRIGATION SYSTEMS

FIELD OF THE INVENTION

The present invention relates to a micro stream emitter for use in irrigation systems and, in particular, a micro stream emitter configured for discharging water at the root ball and soil around plant.

BACKGROUND OF THE INVENTION

Over the years, there have been a number of technological developments in the field of irrigation. Irrigation is the method in which controlled amount of water is supplied to plants at regular intervals for agriculture. Although all irrigation systems provide water to plants, the methods for doing so vary widely.

Localized irrigation is a system where water is distributed under low pressure through a piped network, in a predetermined pattern, and applied as a small discharge to each plant or adjacent to it. Drip irrigation, spray or microsprinkler irrigation and bubbler irrigation belong to this category of irrigation methods.

In addition, localized irrigation considered a type of low-pressure irrigation typically operating with pressures between 15 and 30 psi. It generally considered low volume with application rates of 5 to 70 gallon per hour. Low volume or micro irrigation is ideal for virtually all landscaping applications. It used throughout the world and is suitable for both small residences and large commercial projects. Some typical applications are as follows: Trees and Shrubs Ground Cover Patio & Container Plants Vegetable Gardens Flower Beds Medians & Pathways Island Planters Indoors Hanging Baskets Hedges.

Drip irrigation emitters generally known for use in delivering irrigation water to a precise point at a predetermined and relatively low volume flow rate. Such irrigation devices typically comprise an emitter housing connected to a water supply hose through which irrigation water supplied under pressure.

A reoccurring problem with present-day drip irrigation system has been prolonged exposure to overwatered conditions that can cause some of the roots to die back due to a lack of oxygen. As they die, they decay and rot away. The rot can spread to healthier roots killing them too, even if the soil conditions corrected.

In addition, the drip emitter may restrict root development. Early and outmoded designs for drip systems called for only one or two emitters per plant. This led to very restricted root growth around the few points of moisture and thus to stunted plant growth. One major goal of this invention is to cover the entire area of natural root growth. With the proper placement of emitter, root growth will be uniform, expansive, and healthy.

There are a number of drip irrigation systems that can be buried in the soil, but if your garden has gophers, you will just be offering them an easier way to drink. Occasionally, even mice and wood rats will hear the running water in the drip hose, especially in dry summer climates. The present invention is high enough off the ground making it harder for rodent to get access to the emitter.

Drip emitters do not cleanse the foliage. In arid climates, some plants, such as lettuce and other leafy greens, prefer periodic sprinkling of leaves to wash off accumulated dust, grit, and/or air pollution. These plants need to receive an occasional sprinkling like the kind of stream from the present invention.

An additional problem with drip emitter is it does not create humidity. Many plants, most notably humidity loving perennials from England, the muggy Tropics, and northern Europe, like a moist atmosphere. When these plants are grown outside their natural environment, the present invention is perhaps the better irrigation devices.

Finally, you cannot see the drip system working. With a drip system, the emitters quietly go about their work hidden from view. For some gardeners, this is the beauty of the system. For others, not being able to watch the watering is slightly unsettling. In a poorly designed system, a clogged emitter goes unnoticed until drought stress affects the plant visibly. This is a serious problem poor quality drip emitters and with the present invention, visibility will not be a problem.

Mist irrigation has often been used as an alternative to drip irrigation. A mist emitter has a head that throws out water into the air as a fine mist. Some advantages of mist irrigation over drip irrigation are that a large relatively wet area can be attained from a single mist head, especially when the mist head is quite far off the ground, and that a visual indication of whether the emitter is working is provided.

The problem with mist emitters is that different plants require different precipitation rates. The primary way of varying the precipitation rate is to change the diameter of the pinhole. To do this, a relatively large variety of different mist heads, having different diameter holes, must be stocked. Moreover, because the pinhole is quite tiny, it tends to clog up. Thus, a filtered water supply is required in most mist irrigation systems.

The present invention overcomes the above, briefly described problem by providing a highly efficient and serviceable micro stream emitter that is a truly remarkable innovation with a low precipitation rate, highly uniform distribution, and increased radius range, all in a emitter which providing a flat stream and simultaneously down stream spray.

Another advantage to using the present invention is, simply, control. This method of irrigation is precise and economical. For instance, changes in supply pressure affect discharge rate and uniformity of water distribution if all emitters are identical. This invention has value to the irrigation designer in that it allows the designer to select emitter characteristics depending on the position of the emitter in the field therefore it is desirable to vary the emitter discharge to compensate for changes in topography.

Micro stream emitters are an excellent water-saving alternative to regular spray nozzles, bubblers or even drip irrigation. With built-in pressure compensation and a variety of flow rates, micro stream emitter come in the variety you need to meet your plants' individual watering needs.

SUMMARY OF THE INVENTION

It is an object of the present invention to provide new and improved water irrigation emitters for use in drip type agricultural irrigation. In accordance with the invention, an improved micro emitter is provide with a body having two different geometries water outlet ports providing downward stream into the soil wetting the root zone and with the second geometries water outlet wetting the surrounding plants area.

The micro emitter is a cross between surface spray irrigation and drip irrigation. It has some of the advantages and some of the disadvantages of each type of irrigation. Like drip irrigation, the present invention is considered a type of low-pressure irrigation typically operating with pressures between 15 and 30 psi. The stream irrigation is a method of irrigation when low volume overhead irrigation is desired and typically creates a larger wetted area then drip irrigation making it well suited for irrigating ground covers, large flowerbeds and sandy soil. With the ability to compensate for pressure differences, the micro stream emitters allow the output of water to remain constant regardless of the input pressure. This allows for accurate application never before achieved in drip or spray system.

A more specific object of the invention is to cover the entire area of natural root growth. In addition, creates a larger wetted area then drip irrigation making it well suited for irrigating ground covers, large flowerbeds and sandy soil. Another objective is to provide water emitter, which are desirable from a cost standpoint.

A still additional objective is to provide micro stream emitters with the ability to compensate for pressure differences; the micro stream emitters allow the output of water to remain constant regardless of the input pressure. This allows for accurate application never before achieved in drip system.

While irrigation devices of the type described above have been provided in many different configurations with varying degrees of operational success, there devices, particularly with respect to micro emitter continue to be unreliable in the discharge rate and cover area. With easy installation and the ultimate in reliability of the present invention now every plant, shrub, or tree can receive the same amount of water required with no excess runoff or waste.

DETAILED DESCRIPTION OF THE PREFERRED EMBODIMENTS

Figure 1:
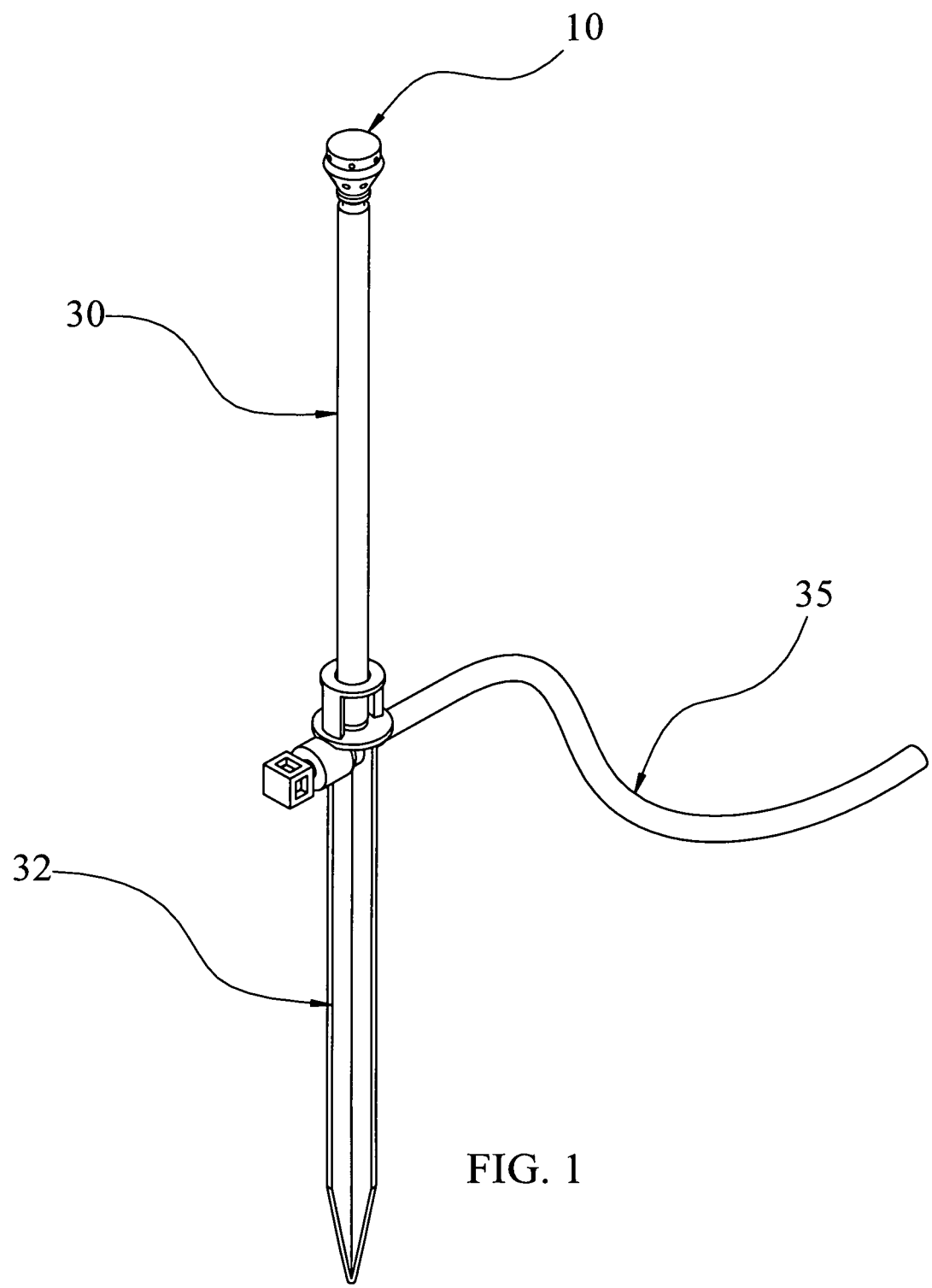
FIG. 1 is a perspective view of a micro stream emitter of this invention connected to a drip riser attached to an adjustable flow stake to be incorporated into an irrigation system.
Figure 2:
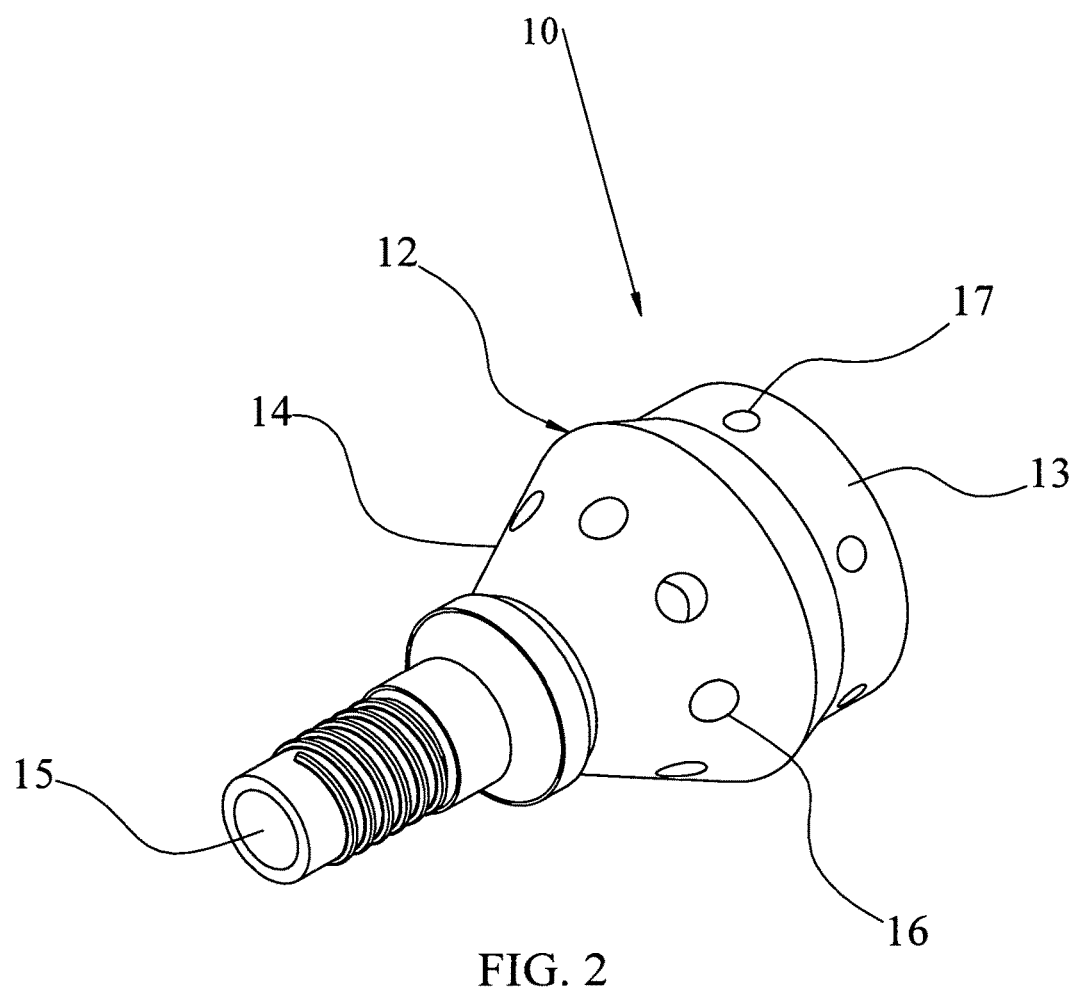
FIG. 2 is a perspective view of the micro stream emitter according to the preferred embodiment in accordance with the invention.
Figure 3:
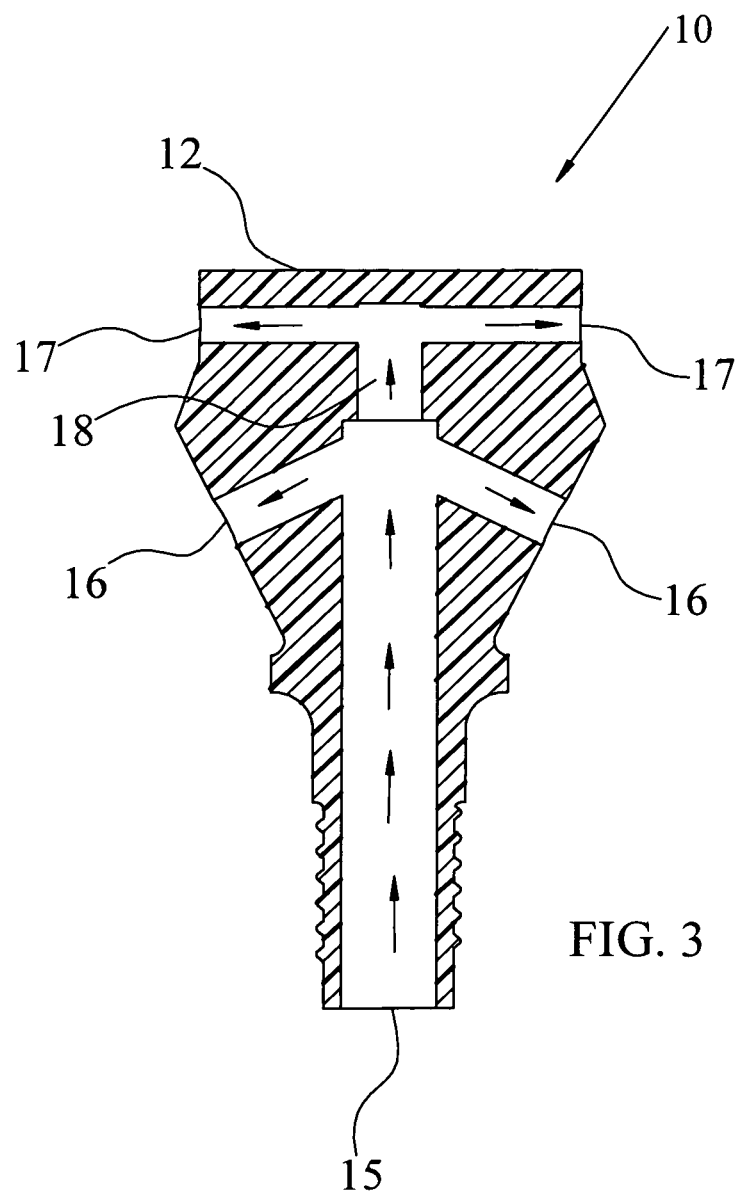
FIG. 3 is a cut-a-way view of the micro stream emitter of FIG. 1.
Figure 4:
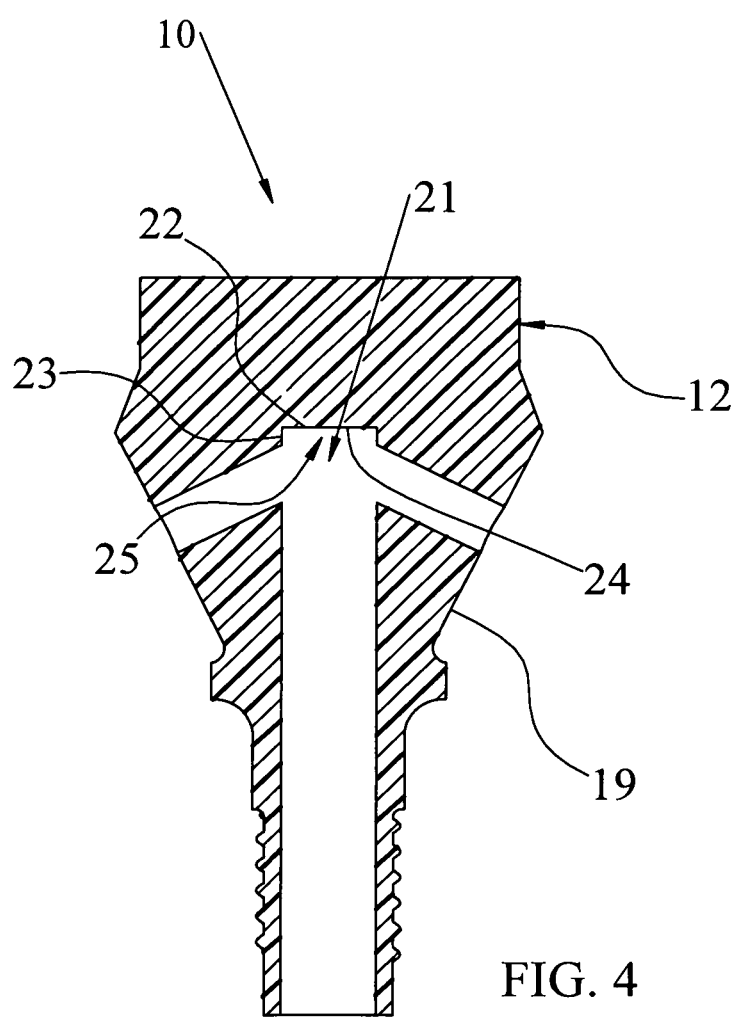
FIG. 4 is a cut-a-way view of the micro stream emitter of the lower portion of the micro stream emitter shown in FIG. 1.
Figure 5:
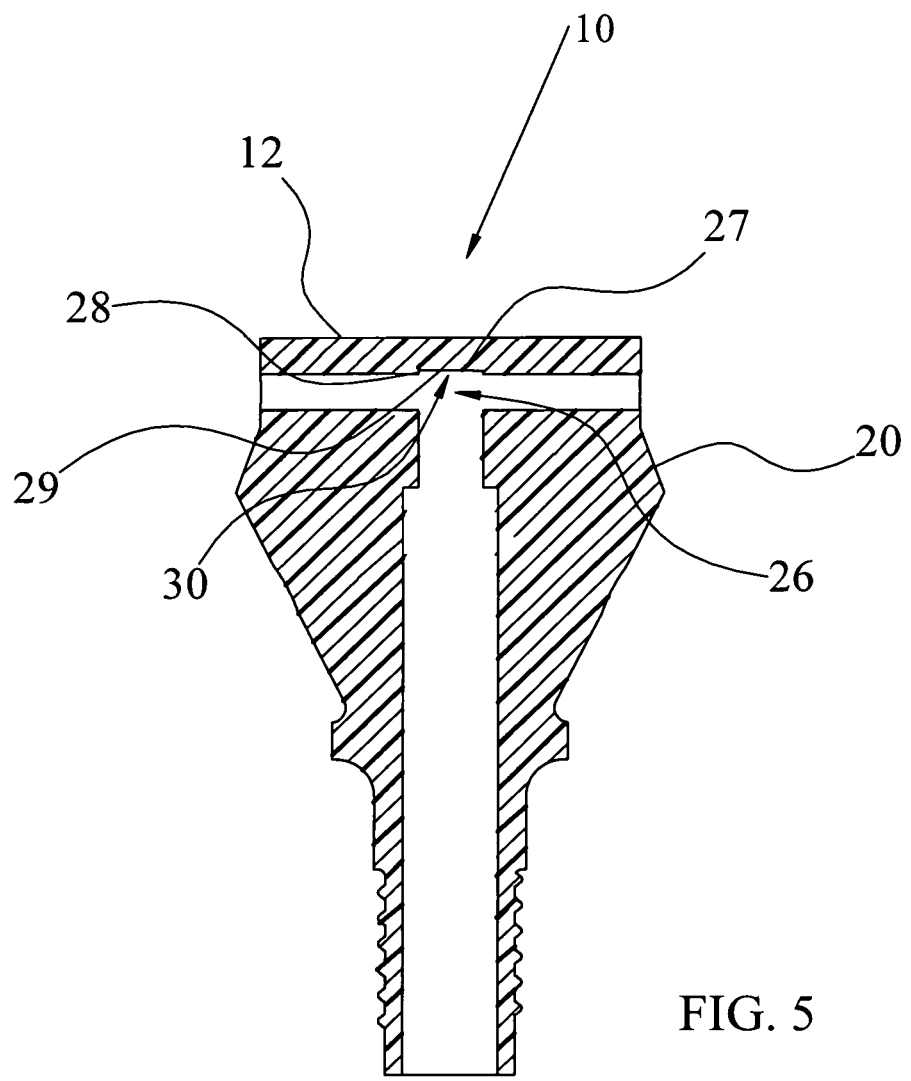
FIG. 5 is a cut-a-way view of the micro stream emitter of the upper portion of the micro stream emitter shown in FIG. 1.
Figure 6:
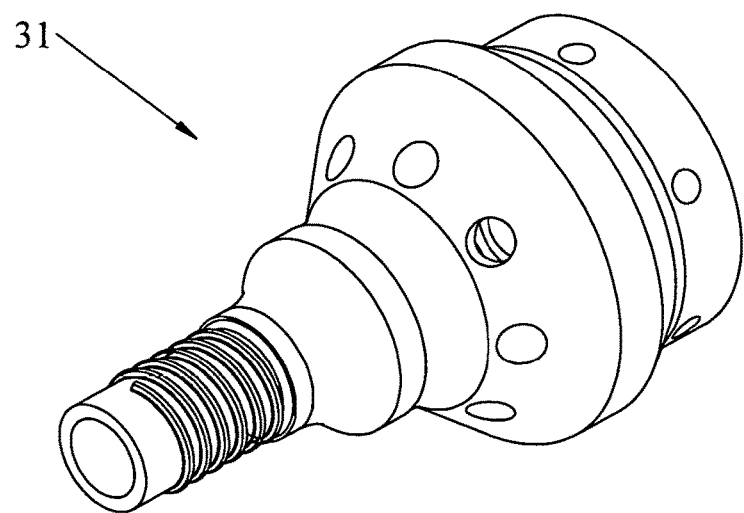
FIG. 6 is an isometric of the micro stream emitter according to the preferred embodiment in accordance with the invention.
Figure 7:
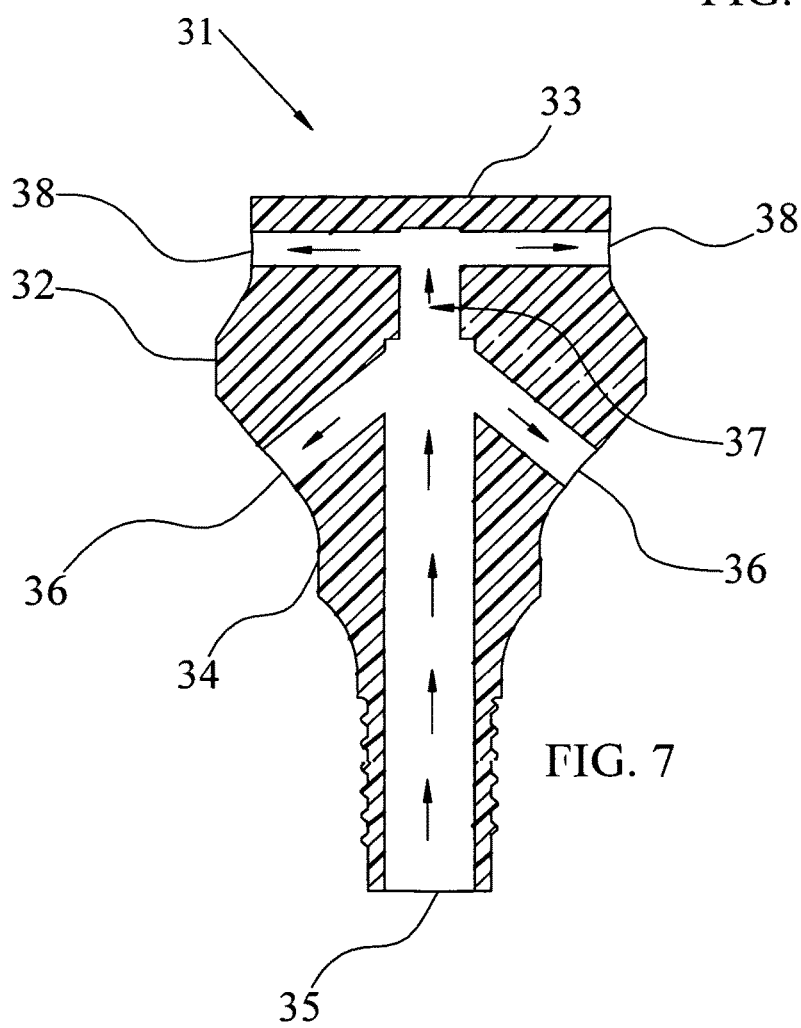
FIG. 7 is a cut-a-way view of the forty-degree micro stream emitter of the upper and lower portion of the micro stream emitter shown in FIG. 6.
Figure 8:
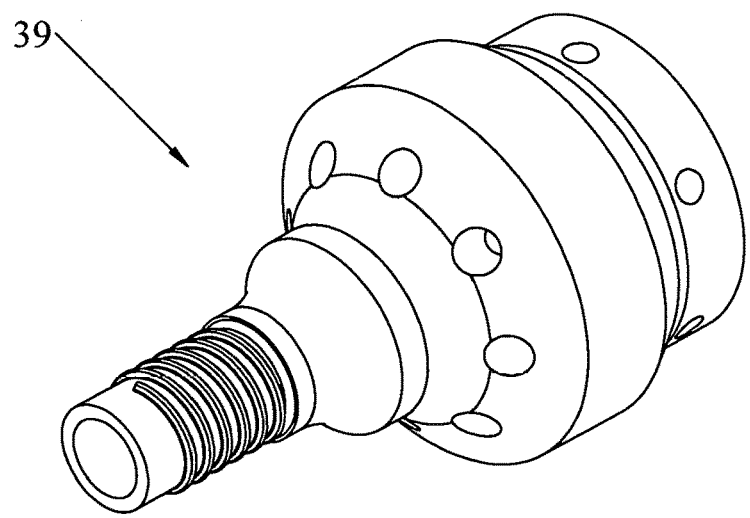
FIG. 8 is an isometric view of the micro stream emitter according to the preferred embodiment in accordance with the invention.
Figure 9:
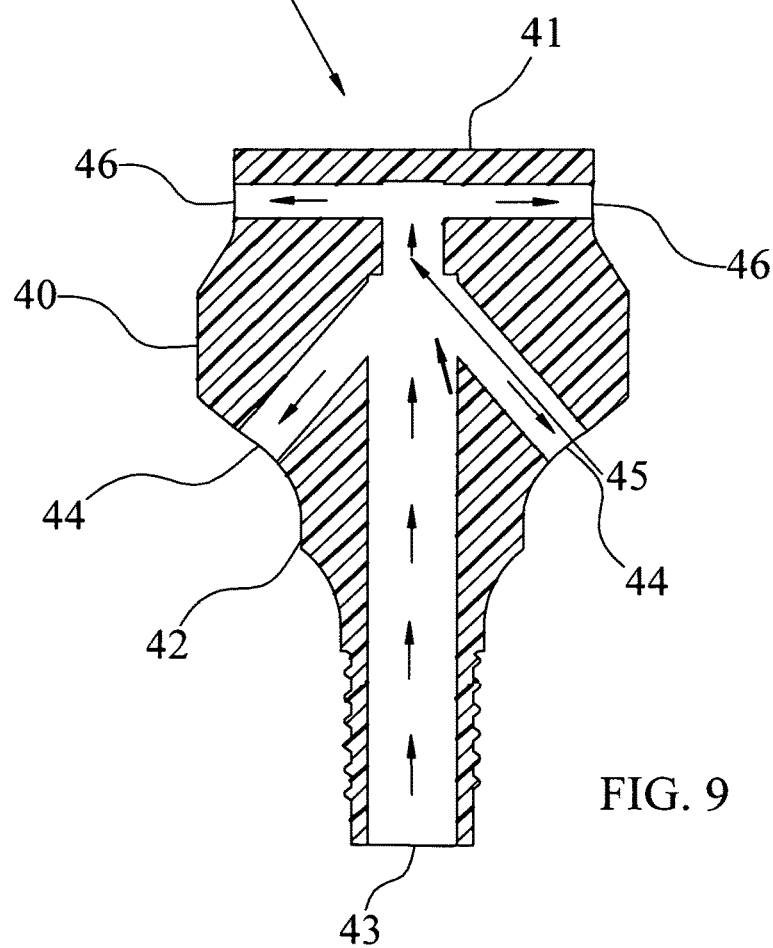
FIG. 9 is a cut-a-way view of the forty-degree micro stream emitter of the upper and lower portion of the micro stream emitter shown in FIG. 8.

In the following detailed description of the preferred embodiment, reference is made to the accompanying drawings, which form a part of this application. The drawing show, by way of illustration, specific embodiments in which the invention may be practiced. It is to be understood that other embodiments may be utilized and structural changes may be made without departing from the scope of the present invention. As generally shown in FIG. 1 the present invention is directed to a micro stream emitter 10, which when these micro stream emitters connected to a drip riser 30, attached to an adjustable flow stake 32. When connected to an water supply tube 35 which delivers water under pressure to the micro stream emitters 10 for purposes of watering or irrigating the area surrounding the micro stream emitters. As substantially shown in FIG. 2, the micro stream emitter 10, has a sturdy plastic body 12 formed of an upper portion 13, and a lower portion 14, within a circular profile. The lower portion 14 of the housing 12 has a $10/32$" threaded inlet port 15, and eight outlet ports 16 could comprise of a 0.070" orifice with a three hundred and sixty degree spray pattern at an angle of twenty five to sixty degree. The upper portion 14 of the housing 12 has six outlet ports 17 could comprise of a 0.050" orifice with a three hundred and sixty degree spray pattern at an angle of zero degree. As best seen in FIG. 3, a cut away view of the internal passage of the micro stream emitter 10 shown in this embodiment actually includes water flowing into the threaded inlet port 15 flowing through the emitter body 12 to the lower outlet ports 16. In traveling through the emitter body 12 past the lower outlet ports 16, water flow through a smaller diameter passage 18 connected to the upper outlet ports 17. As substantially shown in FIG. 4, the lower portion 19 of the emitter body 12 of the micro emitter 10 has an inner cavity 21 with a top wall 22 and a surrounding upstanding peripheral wall 23. The top wall 22 has an annular depression 24 that forms a diaphragm chamber 25. As substantially shown in FIG. 5, the upper portion 20 of the emitter body 12 of the micro emitter 10 has an inner cavity 26 with a top wall 27 and a surrounding upstanding peripheral wall 28. The top wall 27 has an annular depression 29 that forms a diaphragm chamber 30. As substantially shown in FIG. 5, the upper portion 17 of the emitter body 12 of the micro emitter 10 has an inner cavity 24 with a top wall 25 and a surrounding upstanding peripheral wall 26. The top wall 27 has an annular depression 28 that forms a diaphragm chamber 29. As substantially shown in FIG. 7, and referring to FIG. 6 a cut-a-way view of the forty degree down stream emitter 31 of the present invention. In FIG. 7 of the drawing there is shown of another modified micro stream emitter 31, has a sturdy plastic body 32 formed of an upper portion 33, and a lower portion 34, within a circular profile. As shown in FIG. 8 the emitter 31 embodiment actually includes water flowing into the threaded inlet port 35 through the emitter body 32 to the lower outlet ports 36 at a forty degree down stream covering the entire root zone. The water flow will continue to traveling through the emitter body 32 past the lower outlet ports 37, water flow through a smaller diameter passage 38 connected to the upper outlet ports 39. As substantially shown in FIG. 9, and referring to FIG. 7 a cut-a-way view of the sixty degree down stream emitter 39 of the present invention. In FIG. 7 of the drawing there is shown of another modified micro stream emitter 39, has a sturdy plastic body 40 formed of an upper portion 41, and a lower portion 42, within a circular profile. As shown in FIG. 8 the emitter 39 embodiment actually includes water flowing into the threaded inlet port 43 through the emitter body 40 to the lower outlet ports 44 at a forty degree down stream covering the entire root zone. The water flow will continue to traveling through the emitter body 40 past the lower outlet ports 44, water flow through a smaller diameter passage 45 connected to the upper outlet ports 46.

What claimed is:

1. A micro stream emitter for use in irrigation systems comprising:
    a unitary body defined by an upper portion and a lower portion;
    a water inlet port disposed at an end of the lower portion configured for connection to a water supply;
    a water channel extending longitudinally through the body from the inlet port along a central axis of the body;
    a plurality of first water outlet ports being disposed within the upper portion and in communication with the water channel, each first outlet port extending approximately ninety degrees from the water channel;
    wherein each of the plurality of first outlet ports are radially spaced from each other to define a three hundred and sixty degree spray pattern;
    a plurality of second water outlet ports being disposed longitudinally between the plurality of first outlet ports and the inlet port and in communication with the water channel, each second outlet port extending approximately thirty to sixty five degrees from the water channel;
    wherein each of the plurality of second outlet ports are radially spaced from each other to define a three hundred and sixty degree spray pattern; and
    wherein an upper portion of the water inlet channel has a concave surface just above the plurality of first water outlet ports.

* * * * *